United States Patent
Dajaku

(10) Patent No.: US 10,250,091 B2
(45) Date of Patent: Apr. 2, 2019

(54) ELECTRIC MACHINE

(71) Applicant: FEAAM GmbH, Neubiberg (DE)

(72) Inventor: Gurakuq Dajaku, Neubiberg (DE)

(73) Assignee: FEAAM GMBH, Neubiberg (DE)

( * ) Notice: Subject to any disclaimer, the term of this patent is extended or adjusted under 35 U.S.C. 154(b) by 374 days.

(21) Appl. No.: 14/783,837

(22) PCT Filed: Apr. 7, 2014

(86) PCT No.: PCT/EP2014/056936
§ 371 (c)(1),
(2) Date: Oct. 9, 2015

(87) PCT Pub. No.: WO2014/166872
PCT Pub. Date: Oct. 16, 2014

(65) Prior Publication Data
US 2016/0308415 A1    Oct. 20, 2016

(30) Foreign Application Priority Data

Apr. 11, 2013 (DE) .................. 10 2013 103 665

(51) Int. Cl.
*H02K 3/28*  (2006.01)
*H02K 1/16*  (2006.01)
(Continued)

(52) U.S. Cl.
CPC .............. *H02K 3/28* (2013.01); *H02K 1/16* (2013.01); *H02K 3/12* (2013.01); *H02K 21/14* (2013.01); *H02K 29/03* (2013.01)

(58) Field of Classification Search
CPC .. H02K 3/12; H02K 3/14; H02K 3/16; H02K 3/18; H02K 3/28; H02K 21/14; H02K 21/16
(Continued)

(56) References Cited

U.S. PATENT DOCUMENTS

| 3,515,922 A |   | 6/1970  | Fong   |           |
|-------------|---|---------|--------|-----------|
| 5,686,774 A | * | 11/1997 | Slavik | H02K 3/28 |
|             |   |         |        | 310/198   |

(Continued)

FOREIGN PATENT DOCUMENTS

| DE | 19852460 A1 | 5/2000  |
|----|-------------|---------|
| DE | 10031110 A1 | 12/2000 |

(Continued)

OTHER PUBLICATIONS

Mueller, G., et al.: "Berechnung elektrischer Maschinen", Wiley—VCH Verlag, Weinheim, 2008, pp. 3-22, 57, 63, 120-123, 388, 389, 599-601 (ISBN: 3-527-40525-9).

(Continued)

*Primary Examiner* — Quyen P Leung
*Assistant Examiner* — Eric Johnson
(74) *Attorney, Agent, or Firm* — Morgan, Lewis & Bockius LLP

(57) ABSTRACT

The invention relates to an electric machine, which comprises a stator (1) and a rotor (2) that can be moved in relation to the stator. The stator (1) has a first multi-strand winding (I) and at least a second multi-strand winding (II), which each comprise two sub-windings (A1, A2) mechanically shifted in relation to each other. In a slot (3) of the stator, a number of windings (Nw1) of the first sub-winding (A1) of a multi-strand winding is different from a number (Nw2) of windings of the second sub-winding (A2) of said multi-strand winding. The stator (1) has a number of slots (3) that is twice the number of slots minimally required for a given pole pair number p of the rotor (2) for one of the multi-strand windings.

24 Claims, 17 Drawing Sheets

(51) Int. Cl.
*H02K 21/14* (2006.01)
*H02K 3/12* (2006.01)
*H02K 29/03* (2006.01)

(58) Field of Classification Search
USPC .................................. 310/195, 198, 208, 210
See application file for complete search history.

(56) References Cited

U.S. PATENT DOCUMENTS

| | | | |
|---|---|---|---|
| 5,723,930 | A | 3/1998 | Ho et al. |
| 6,414,410 | B1 | 7/2002 | Nakamura et al. |
| 2006/0006655 | A1 | 1/2006 | Kanazawa et al. |
| 2010/0187941 | A1* | 7/2010 | Roth ........................ H02K 3/28 310/203 |
| 2011/0043069 | A1* | 2/2011 | Tanaka .................... H02K 3/28 310/198 |
| 2012/0001512 | A1* | 1/2012 | Dajaku .................. H02K 1/165 310/195 |
| 2012/0025634 | A1* | 2/2012 | Dajaku .................... H02K 3/20 310/12.21 |
| 2012/0228981 | A1* | 9/2012 | Dajaku .................. H02K 1/165 310/195 |
| 2013/0076175 | A1 | 3/2013 | Turnbull et al. |
| 2014/0035425 | A1 | 2/2014 | Dajaku |
| 2014/0191628 | A1* | 7/2014 | Nakano ................ H02K 1/2746 310/68 B |

FOREIGN PATENT DOCUMENTS

| | | |
|---|---|---|
| DE | 102007004561 A1 | 7/2008 |
| DE | 102008051047 A1 | 4/2010 |
| DE | 102008057349 B3 | 7/2010 |
| DE | 102010037588 A1 | 3/2012 |
| DE | 102011011023 A1 | 8/2012 |
| EP | 1702789 A2 | 9/2006 |
| WO | 2010/040785 A2 | 4/2010 |
| WO | 2010/054651 A2 | 5/2010 |
| WO | 2011/015606 A1 | 2/2011 |

OTHER PUBLICATIONS

Richter, R.: "Lehrbuch der Wicklungen elektrischer Maschinen", Verlag G. Braun, Karlsruhe, 1952, pp. 181-216.
Huth, G.: "Permanent-Magnet-Excited AC Servo Motors in Tooth-Coil Technology", IEEE Transactions on Energy Conversion, vol. 20, No. 2, Jun. 2005, pp. 300-307.
Mosebach, H.: "Systematik dreistraengiger symmetrischer PM-erregter PPSM", Jan. 1, 2005, <https://www.tu-branschweig.de/Medien-DB/imab/09-Jahresberichte/2005/07_Mosebach2005.pdf>, XP05518074.

* cited by examiner

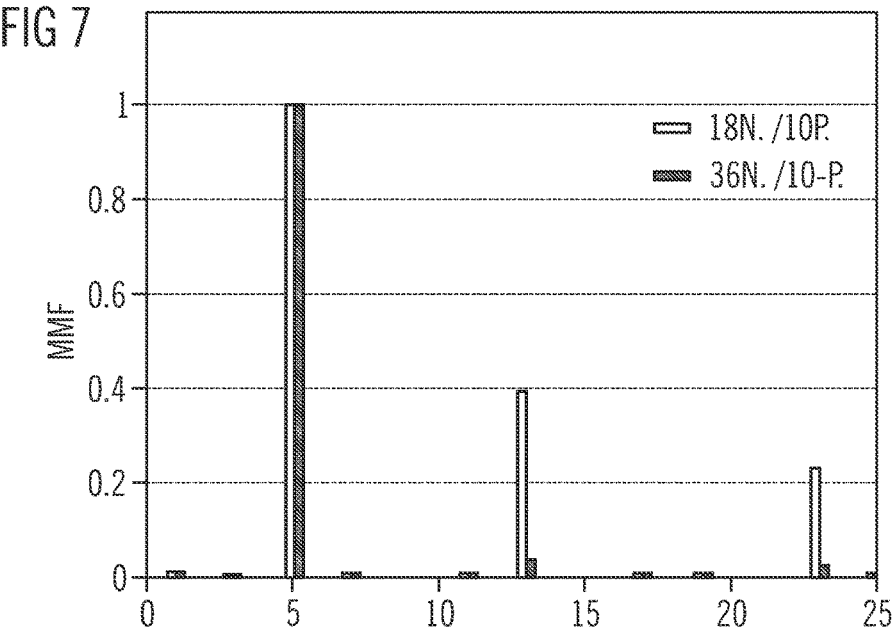
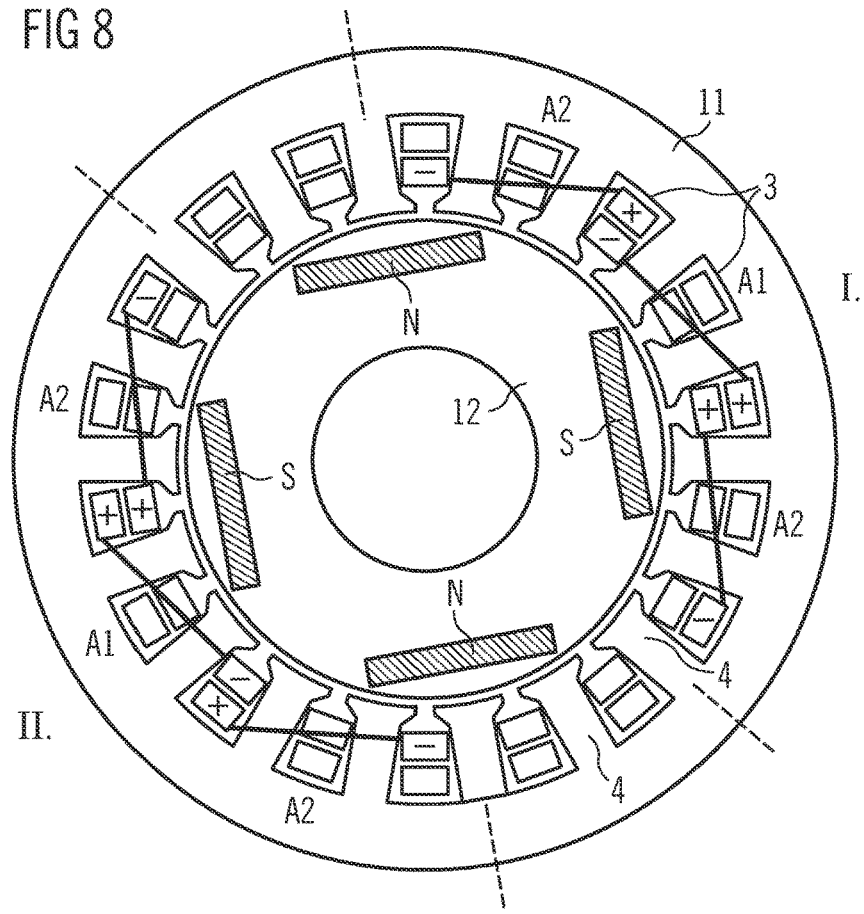

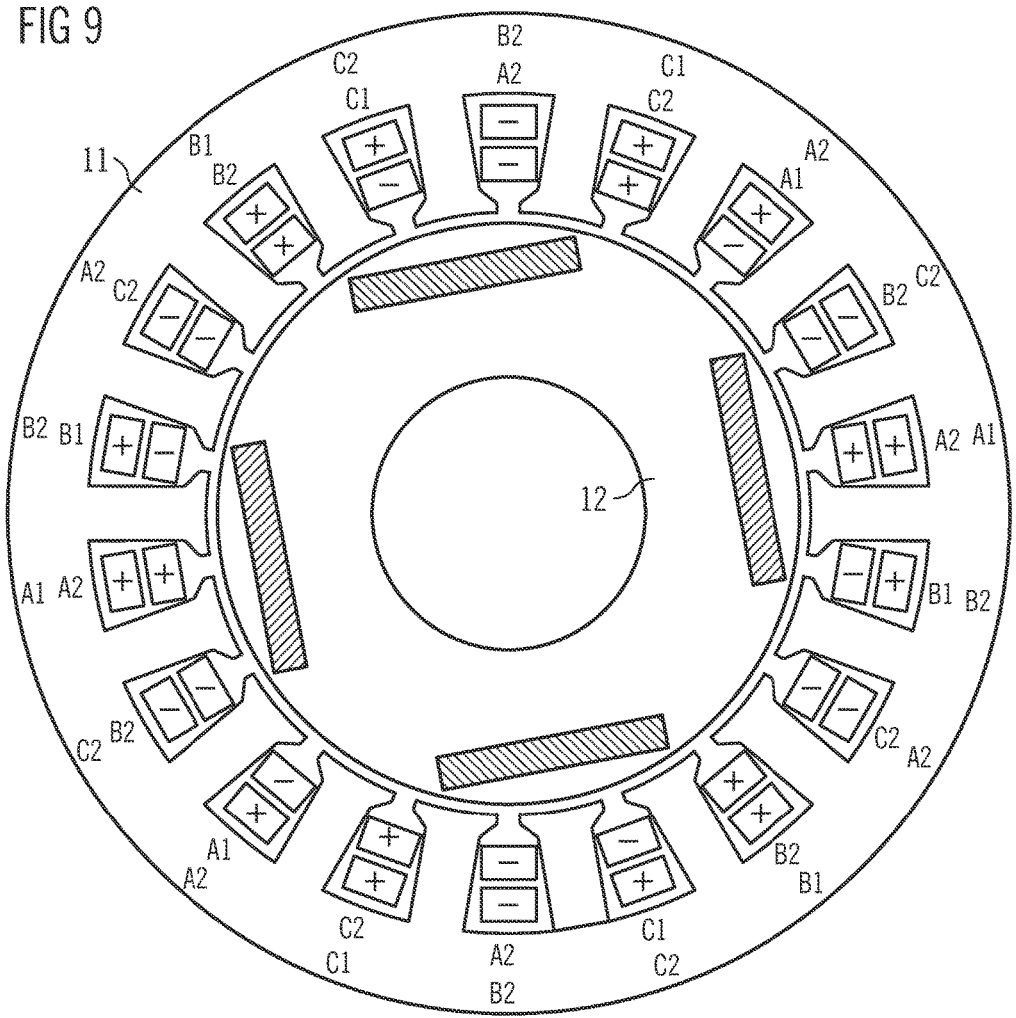

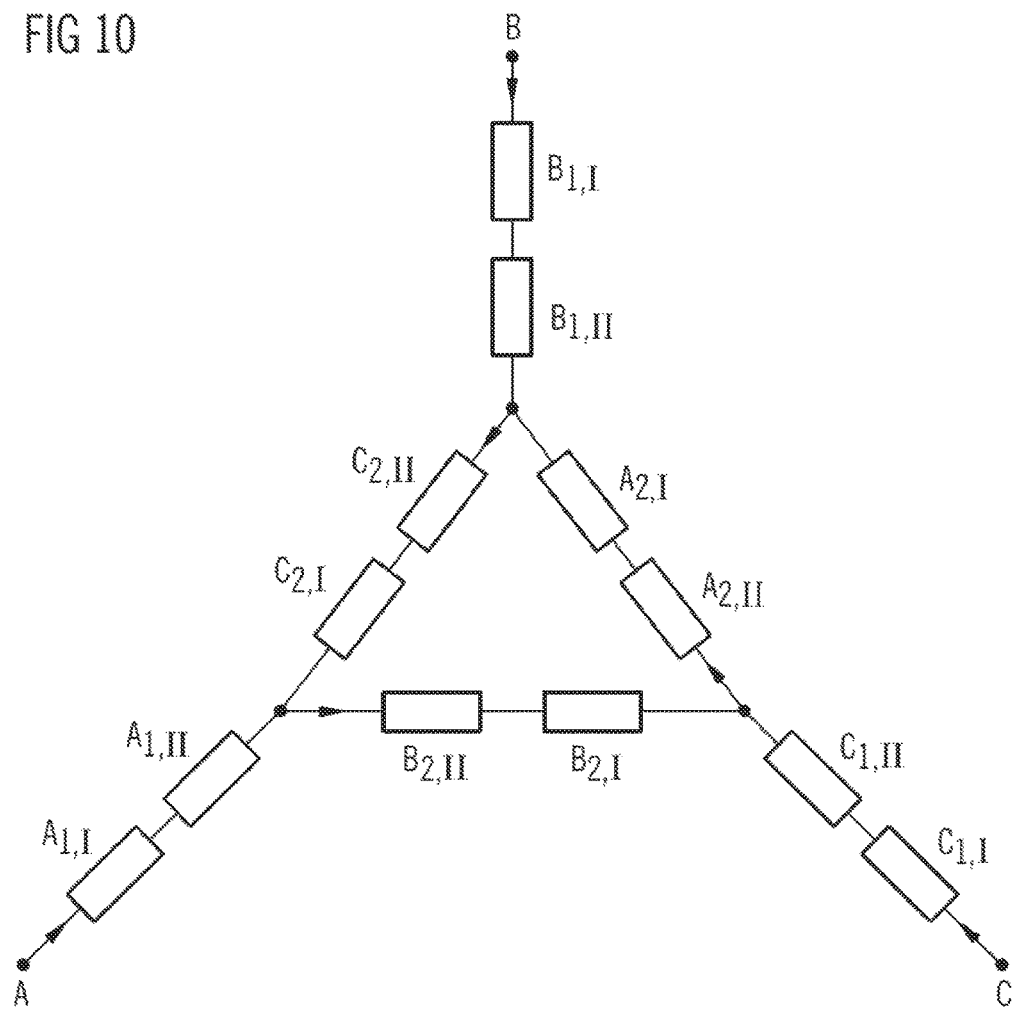

ELECTRIC MACHINE

An electric machine comprises a stationary stator and a rotor which is movably supported in relation to said stator.

Whereas the stator usually is provided for receiving one or more electric winding systems which can be of the multi-phase type, the magnetic field of the rotor is frequently produced by means of permanent magnets. An electromagnetic torque on the shaft of the rotor is generated by the interaction of the magnetic fields of stator and rotor.

Compared to distributed windings, concentrated windings (tooth-concentrated windings) in the stator have the advantage of a less complex manufacturing of the windings, higher slot fill factors, lower cogging torques and smaller fault tolerances. The coils of the stator winding are either wound on each tooth of the stator, as a two-layer winding, or on each second tooth as a one-layer winding.

In comparison with distributed windings, a disadvantage with concentrated windings is represented by the higher amounts of the harmonics existing in addition to the harmonic wave of the magnetomotive force which is used as a working wave.

In permanent magnet type machines, the torque is produced by the interaction of a specific harmonic wave of the stator with the permanent magnets of the rotor, which is referred to as the working wave. All other harmonics which are of higher or lower order than the working wave and rotate with different speed and in different directions, lead to undesired effects such as noise and vibration and result in losses.

It is the object of the present invention to provide an electric machine whose stator is suitable for concentrated windings and which combines a high efficiency with the possibility of an automatable manufacturing process.

The object is achieved according to the suggested principle by an electric machine comprising the features of the claims.

Further developments and configurations of said principle are provided in the dependent sub-claims.

In one embodiment, an electric machine comprises a stator and a rotor which can be moved in relation to the stator. The stator comprises at least two multi-strand windings. Each multi-strand winding comprises at least two sub-windings which are mechanically shifted in relation to each other. For one of the multi-strand windings, it is the case that in a slot of the stator a number of windings of the first sub-winding differs from the number of windings of the second sub-winding of said multi-strand winding. In addition, the stator has twice the number of slots with respect to the number of slots minimally required for a given pole pair number of the rotor related to a multi-strand winding.

As will be shown in detail below on the basis of exemplary embodiments, the suggested principle allows for the avoidance of undesired harmonics of the magnetomotive force. Not only those harmonics which are below the harmonic wave being used as the working wave are reduced virtually to zero, but also the higher harmonics. In this way, the suggested principle combines a high efficiency with a stator winding which can be wound in a relatively simple automated manner. The virtually complete reduction of sub-harmonic waves and higher harmonics further results in a low-vibration and low-noise operation of the machine.

The doubling of the number of the slots may be related to the number of slots minimally required for a given pole pair number p of the rotor, a given number of coils of a strand on neighboring teeth of the stator and for a given number of the strands of the respective winding of the stator.

The number of windings of the first sub-winding and the number of windings of the second sub-winding may differ from each other such that in operation of the electric machine a first undesired sub-harmonic of the magnetomotive force caused by the stator is reduced.

The term "winding number" is to be understood as the number of conductor portions of a coil of a winding in a slot.

In one implementation, the winding number of the first sub-winding preferably ranges in an interval from including 50% to 100% of the winding number of the second sub-winding.

In a further development, at least two windings with different winding numbers or windings of different strands are arranged in each slot of the stator.

The coils of each multi-strand winding may be arranged around at least two neighboring teeth of the stator. Teeth are formed in each case between neighboring slots of the stator.

It is preferred that the first and the at least one second multi-strand windings are a three-phase winding. This allows an operation on a three-phase network.

In one embodiment, the ratio of the number of the slots of the stator to the number of the poles of the rotor is 36:10. In another embodiment, the ratio of the number of the slots of the stator to the number of the poles of the rotor is 18:4.

Starting from these two examples, the ratio of the number of the slots to the number of the poles may also amount to integral multiples of the number of the slots and the number of the poles, with the number of the poles being equal to twice the pole pair number p of the rotor.

In one embodiment, the first and second multi-strand winding systems have the same number of strands and are designed for the same number of poles. In this implementation, the first and second multi-strand winding systems are further spatially shifted with respect to each other by an electric angle. Only coils of one of the multi-strand winding systems are inserted in each slot of the stator.

The two multi-strand winding systems may be supplied by a multi-phase electricity system in such a manner that the winding system comprising the respectively second sub-windings is supplied by a multi-phase electricity system which is shifted in the electric phase by an angle of 90° plus an angle δ relative to another multi-phase electricity system which supplies the winding system comprising the respectively first sub-windings.

The angle δ may be equal to zero or different from 0.

As an alternative or in addition, the respectively first sub-windings may be supplied by a first multi-phase electricity system with a first current amplitude and the two second sub-windings may be supplied by a second multi-phase electricity system with a second current amplitude differing from the first current amplitude.

Here, the term "supplying" comprises both the motor-related and the generator-related operation of the electric machine on an electric power grid.

In another embodiment, the number of windings of the first sub-winding differs from the number of windings of the second sub-winding of the first multi-strand winding system. Similarly, the second multi-strand winding system has a number of windings of the first sub-winding which differs from the number of windings of the second sub-winding.

A first inverter may be provided for supplying the winding system comprising the respectively first sub-windings. A second inverter may be provided for supplying the winding system comprising the respectively second sub-windings with a second multi-phase electricity system.

If as an alternative only one inverter is to be provided for supplying the stator windings, a star-delta connection may be used, for example, in which the winding system comprising the respectively first sub-windings and the winding system comprising the respectively second sub-windings are interconnected with each other. Here, the ratio between the winding numbers of the coils in the delta and the winding numbers of the coils in the star is preferably in a range from 1.3:1 to 2.5:1, the limits of the interval being understood as being included.

The ratio between the winding numbers of the coils in the delta and the winding numbers of the coils in the star is preferably √3:1.

In one embodiment, a coil of a sub-winding of a multi-strand winding in a first slot has a first winding number, said coil in a second slot having a second winding number.

This may be implemented, for instance, in that the stator comprises two opposite main faces for contacting the electric winding, a first terminal of the coil being formed on a first main face of the two opposite main faces and a second terminal of the coil being formed on a second main face of the opposite main faces.

Preferably, the sums of the winding numbers in neighboring slots are different.

In the first slot, a further coil with the first winding number may be provided. In the second slot, a further coil with the second winding number may be provided, with the first and second winding numbers being different.

Preferably, the coils in the first slot are associated to different strands and the coils in the second slot are associated to the same strand and different sub-windings.

The electric machine may be one of the following types: a linear machine, axial flux machine, radial flux machine, asynchronous machine or synchronous machine. The machine may be designed as a machine with an internal rotor or as a machine with an external rotor.

The rotor may be one of the following types: a cage rotor, a multilayer rotor in case of the asynchronous machine or a permanent magnet rotor in case of the synchronous machine, a rotor with buried magnets or an electrically supplied rotor, in particular a non-salient pole rotor, a leg pole rotor, heteropolar rotor, homopolar rotor or synchronous reluctance rotor.

Further details and configurations of the suggested principle are explained in more detail below on the basis of several exemplary embodiments with the aid of drawings in which:

FIG. 1 shows an exemplary embodiment of an electric machine comprising 36 slots and ten poles by means of an exemplary cross-section including one phase, FIGS. 2A to 2C show the winding layout of the example of FIG. 1 in three examples, FIG. 3 shows the exemplary embodiment of FIG. 1, but not only for one phase but for all of the phases, FIG. 4 shows an exemplary supplying of the windings of the machine of FIG. 3 in a star-delta connection, FIG. 5 shows the distribution of the magnetomotive force using the example of the machine of FIG. 3, FIG. 6 shows the partitioning of the magnetomotive force into harmonics for this example, FIG. 7 shows a comparison of the harmonics of the magnetomotive force in the suggested machine according to FIG. 3 and a conventional machine comprising 18 slots and ten poles, FIG. 8 shows another exemplary embodiment of the suggested principle on the basis of a machine comprising 18 slots and four poles on the basis of the winding layout for one phase, FIG. 9 shows the implementation of FIG. 8, but with the complete windings for all phases, FIG. 10 shows an exemplary interconnection of the windings of the machine of FIG. 9 in a star-delta connection, FIG. 11 shows the distribution of the magnetomotive force of the machine of the exemplary embodiment of FIG. 9, FIG. 12 shows the related distribution of the harmonics of the magnetomotive force, FIG. 13 shows a comparison of the harmonics of the magnetomotive force in the case of a machine according to FIG. 9, on the one hand, and a conventional machine comprising nine slots and four poles on the other hand, FIG. 14 shows another exemplary embodiment of a machine comprising 36 slots and ten poles comprising a rotor with permanent magnets, FIG. 15 shows another implementation of an asynchronous machine comprising 36 slots and ten poles, FIG. 16 shows an exemplary embodiment of a synchronous machine comprising 36 slots and ten poles according to the suggested principle, FIG. 17 shows an exemplary embodiment of a synchronous reluctance machine comprising 36 slots and ten poles according to the suggested principle, FIG. 18 shows a machine with permanent magnets and comprising 18 slots and four poles according to the suggested principle, and FIG. 19 shows an asynchronous machine comprising 18 slots and four poles according to the suggested principle on the basis of an example.

Figure 1:
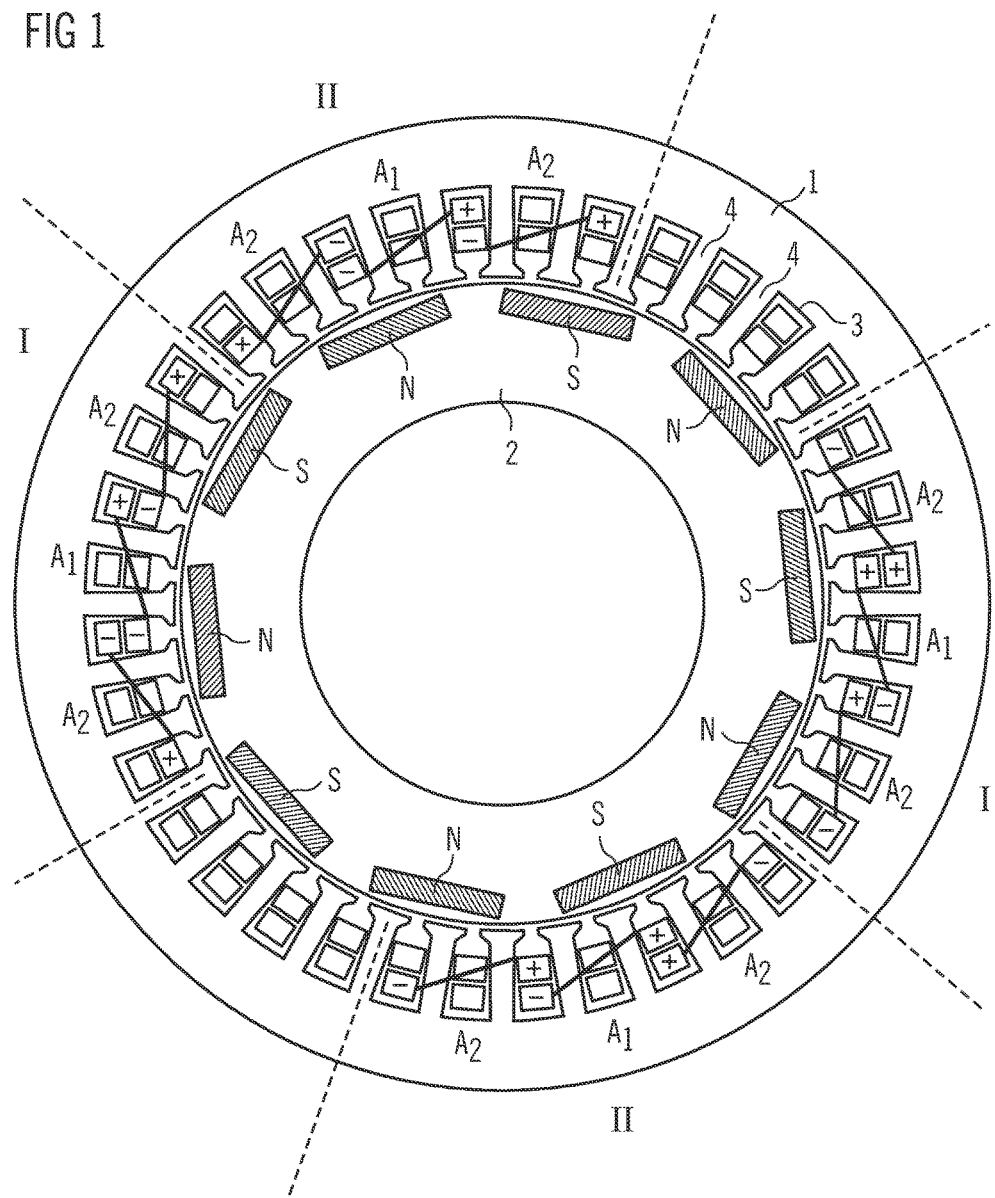

FIG. 1 shows a first exemplary embodiment of an electric machine according to the suggested principle on the basis of a cross-sectional illustration. The machine comprises a stator 1 and an internal rotor 2 which is movable with respect to the stator. For better clarity, only coils of those strands are drawn in the stator 1 of FIG. 1 which belong to the winding systems of the first electric phase A. These winding systems of the phase A comprise a first multi-strand winding I and a second multi-strand winding II. Each multi-strand winding I, II comprises two sub-windings A1, A2. The sub-windings A1, A2 of each multi-strand winding I, II are mechanically shifted in relation to each other. In the embodiment of FIG. 1, the first multi-strand winding I and the second multi-strand winding II of the first phase A are shifted with respect to each other, too.

The symbols "+" and "−" designate the respective winding sense of the coils of the sub-windings of the respective multi-strand winding.

With regard to a machine with only one multi-strand winding, requiring a defined minimum number of slots for a given pole pair number of the rotor, the number of the slots 3 of the stator is doubled in the present case. In the present example, a minimum number of slots of 18 would be required in the case of only one multi-strand winding I and a number of poles of 10 of the rotor, i.e. a pole pair number p of 5, and in case of designing said one multi-strand winding with two sub-windings A1, A2 mechanically shifted in relation to each other. The doubling results here in the shown slot number of 36 slots. To this end, the coils of each sub-winding of each multi-strand winding I, II are wound around two neighboring teeth 4 in each case, with the teeth 4 being formed respectively between neighboring slots 3 of the stator.

The principle of the design of a multi-strand winding which has sub-windings mechanically shifted in relation to each other is shown in detail in document DE 10 2011 011 023 A1. With regard to the construction of a multi-strand winding comprising sub-windings which are shifted with respect to each other, reference is made in this respect to the full content of said document.

In the present case, the poles of the rotor 2 are formed by permanent magnets; in this arrangement, north and south poles N, S are inserted as buried magnets in alternating fashion along the circumference of the rotor.

Figure 2:
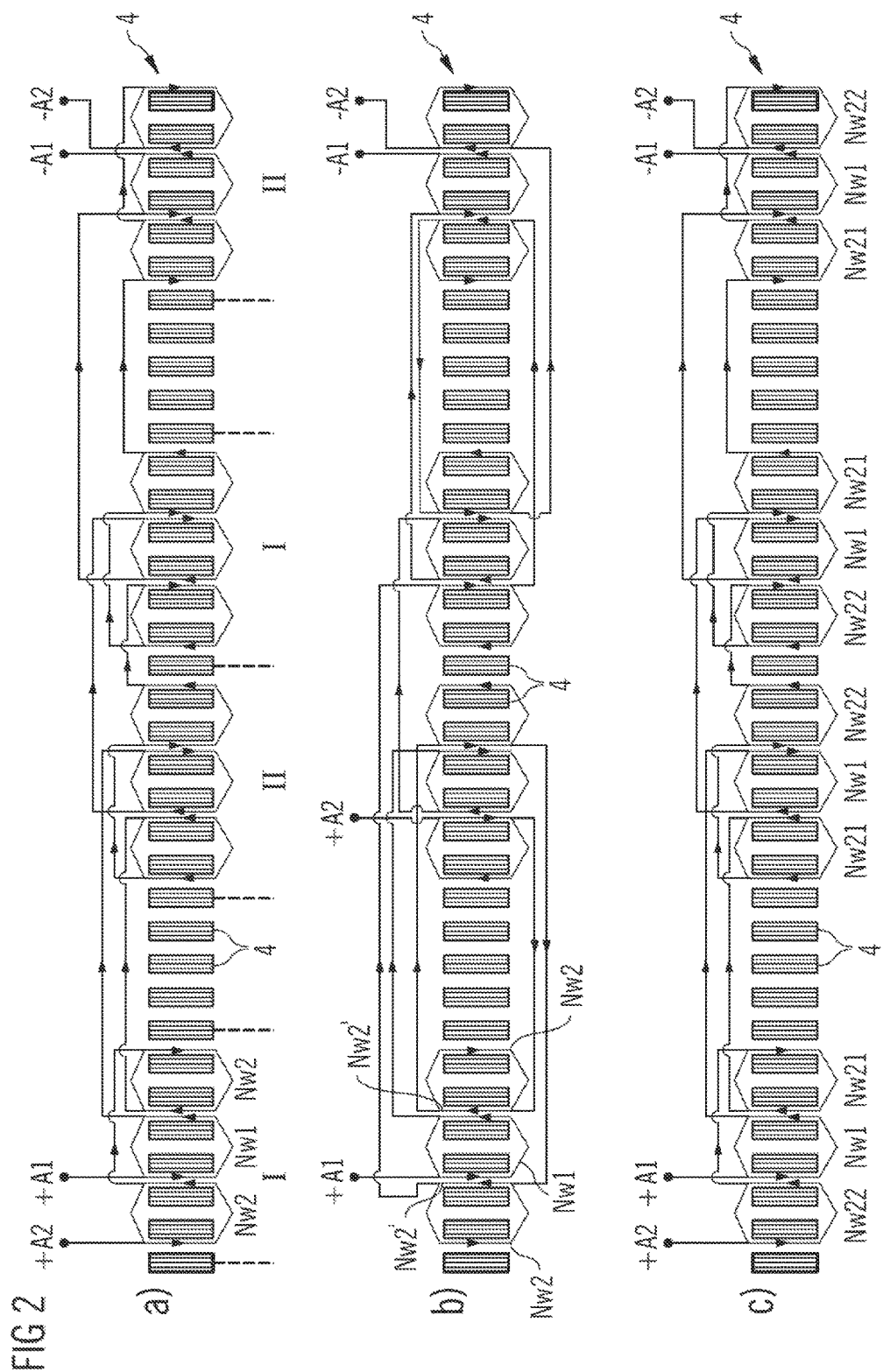

FIG. 2 illustrates the layout of the stator winding for the first electric phase A. Said winding comprises the first sub-winding A1 and the second sub-winding A2. In the first example according to FIG. 2A, the two sub-windings have differing winding numbers of their coils. The coils of the first sub-winding A1, for instance, are realized with a first winding number NW1, whereas the coils of the second sub-winding A2 are realized with a second winding number NW2 which differs from the first winding number NW1.

The allocation of the sub-windings A1, A2 to the first and second winding system I, II is marked in a corresponding manner.

FIG. 2B shows another implementation of the different winding numbers of the sub-windings. The sub-windings are again realized with different winding numbers NW1, NW2 with regard to the coils of the sub-windings A1, A2. In addition, the coil sides of the second sub-winding are implemented with differing winding numbers Nw2, Nw2'. In other words, the coils of the second sub-winding have differing numbers of conductor portions in the two slots of the same coil. In FIG. 2B, this can be seen in the way that the respective coil enters and exits the stator on different main faces of the stator which are opposite each other.

Another implementation of the different winding numbers is shown in FIG. 2C in which neighboring coils of the second sub-winding A2 are realized with different winding numbers. Accordingly, the implementation the first sub-winding A1 is realized unchanged with coils of the winding number NW1. Deviating from this, however, the second sub-winding A2 is realized with coils of the winding number NW21, on the one hand, and NW22 on the other hand, which are alternating.

A further particular feature is that in this configuration according to FIG. 2C the winding of the first winding system 1 differs from the second winding system II, in each case related to the second sub-winding. The coils of the first winding system 1 are designated with NW22, NW1, NW21 and the coils of the second winding systems with NW21, NW1, NW22 as read from left to right.

Figure 3:
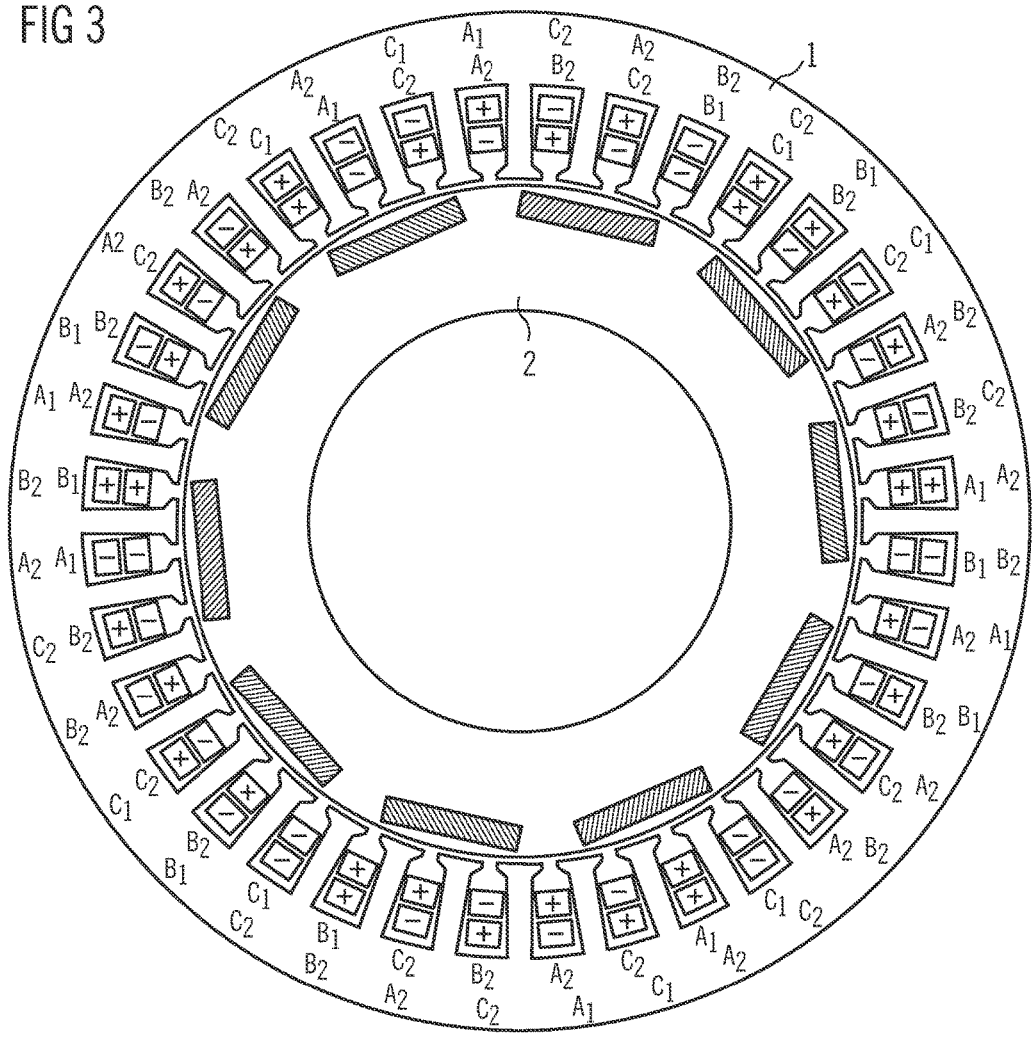

FIG. 3 shows the embodiment according to FIG. 1, showing not only the winding with the two multi-strand winding systems which is associated to the first phase A, but the winding systems of the two other phases B, C of the machine in three-phase design being also indicated. The multi-strand windings and sub-windings as well as the different winding numbers are designed here for the phases B and C in corresponding manner regarding the phase A explained above.

Figure 4:
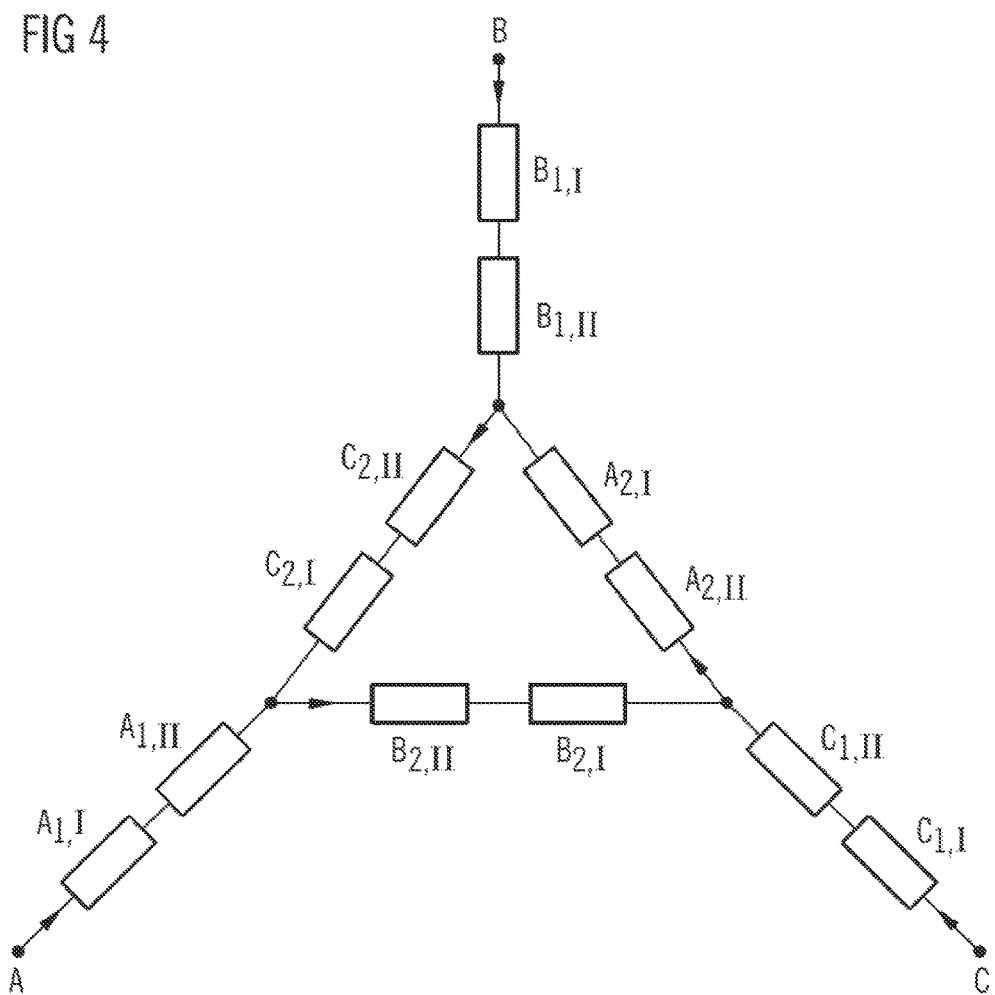

FIG. 4 explains the supplying of the stator windings of the implementation according to FIG. 3 in a delta-star-interconnection. The three electric phases are again referred to as A, B, C. It is remarkable that each sub-winding, for instance A1, of both multi-strand winding systems of the same phase are connected in series with each other. This results, for instance, in the series connection of the two multi-strand winding systems, insofar as the first sub-windings of the first phase are concerned, in A1I in series to A1II. The series connections of the second sub-windings of the same phase are realized in the legs of the delta, whereas in complementary connection thereto in the external nodes of the delta, for the respective electric connection of said phase, the series connection of the two multi-strand winding systems of said phase are arranged.

As an alternative to this, the first and second sub-windings of the multi-strand winding systems may also be supplied by two different electric multi-phase systems, for instance with two different inverters.

Figure 5:
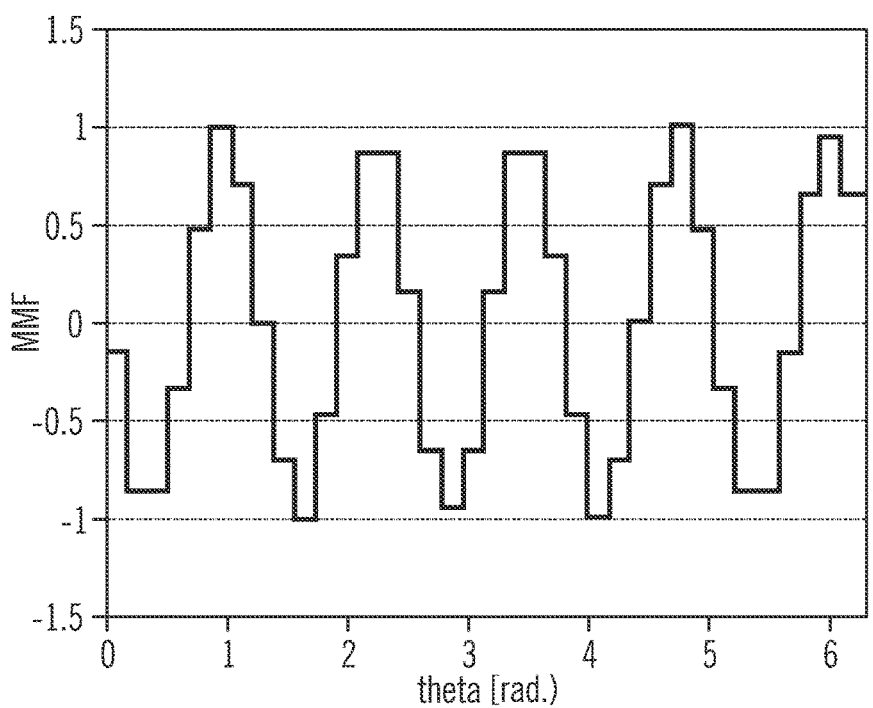
Figure 6:
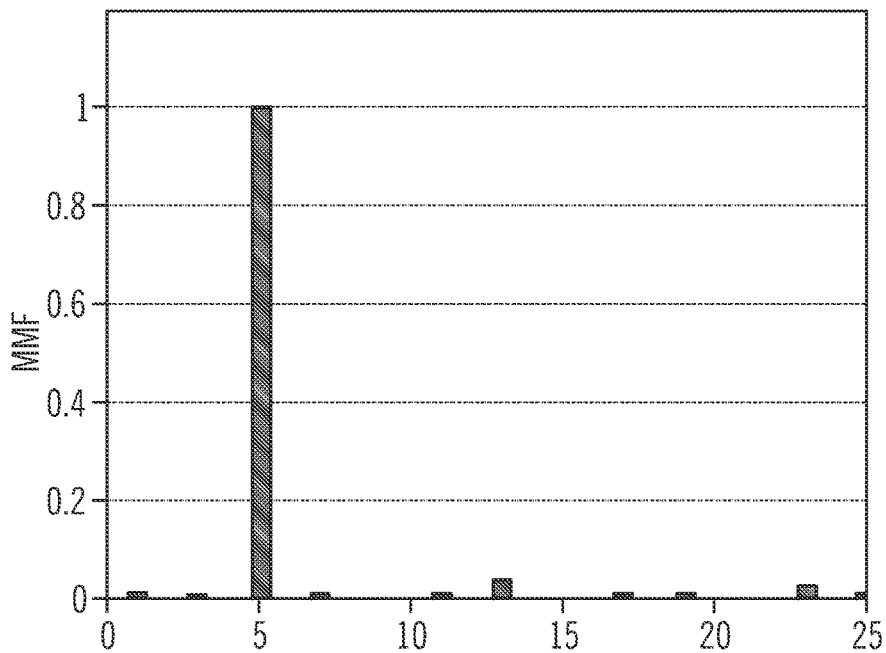

FIGS. 5 and 6 show, for the electric machine according to the example of FIG. 3, the distribution of the magnetomotive force over a full revolution of the machine of $2\pi$ (FIG. 5) as well as the distribution of the higher harmonics for the orders 0 to 25 (FIG. 6).

It can be seen that—apart from the fifth harmonic wave of the magnetomotive force which is used as the working wave—virtually all sub-harmonic waves as well as the illustrated higher harmonics of said fifth harmonic used as working wave do not exist or show a vanishingly small contribution.

With this, the advantage of the suggested principle is particularly obvious, i.e. to create an electric machine which has no distributed windings, but comprises windings which can be machined with a low effort and at the same time has very low losses.

FIG. 7 illustrates this again by means of a comparison of the suggested machine comprising 36 slots and ten poles with another machine which merely comprises one multi-strand winding per phase with two sub-windings and has 18 slots and ten poles. It can be seen that the suggested principle of doubling the slots with such a machine allows a significant reduction in particular of the 13th and 23rd harmonic wave of the magnetomotive force.

FIGS. 8 to 13 describe another exemplary embodiment of the suggested principle, which is not applied as in the preceding example according to FIG. 3 to a machine comprising 36 slots and ten poles, but to a machine comprising 18 slots and four poles. Accordingly, the stator 11 of the electric machine of FIG. 8 comprises a total of 18 slots 3 uniformly distributed along the circumference and again having teeth 4 formed therebetween. The internal rotor 12 comprises four permanent magnets which are alternatingly realized as north and south poles N, S. The winding of the stator 11 of the electric machine of FIG. 8 again comprises two multi-strand windings which are referred to as I and II. The first multi-strand winding I comprises a first sub-winding A1 and a second sub-winding A2. In like manner, the second multi-strand winding II comprises a first sub-winding A1 and a second sub-winding A2. Both the two sub-windings A1, A2 with respect to each other and the two multi-strand windings I, II are mechanically shifted in relation to each other. Also in the implementation of FIG. 8, the stator has twice the number of slots 3 with respect to the number of slots 3 minimally required for the given pole pair number 2 of the rotor 12 in the case of a single multi-strand winding, namely nine slots.

Whereas FIG. 8 again shows only those windings which are associated to the first electric phase A, FIG. 9 indicates the complete winding plan of this embodiment with the windings for all three electric phases A, B, C. Here, the windings which are associated to the two electric phases B, C have a construction which corresponds to that of the first phase A and will not be described here once again.

The implementation of the electric machine according to FIG. 9 may also be electrically operated with a star-delta connection, as shown in FIG. 10. This interconnection corresponds to that of FIG. 4 and does not need to be described here once again.

The different winding numbers of the coils of the sub-windings in the implementation according to FIG. 9 can be configured in analogy to the possibilities shown in FIG. 2.

Figure 11:
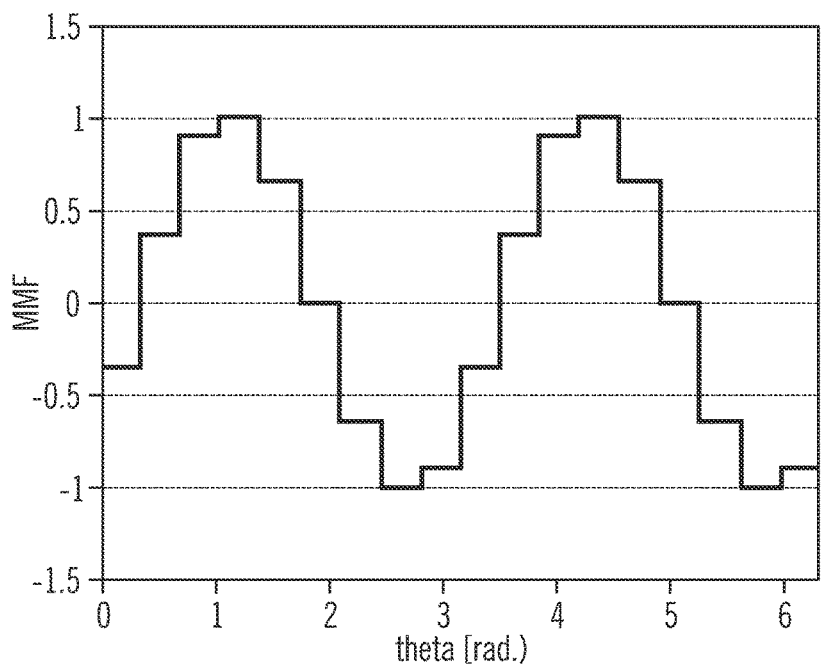
Figure 12:
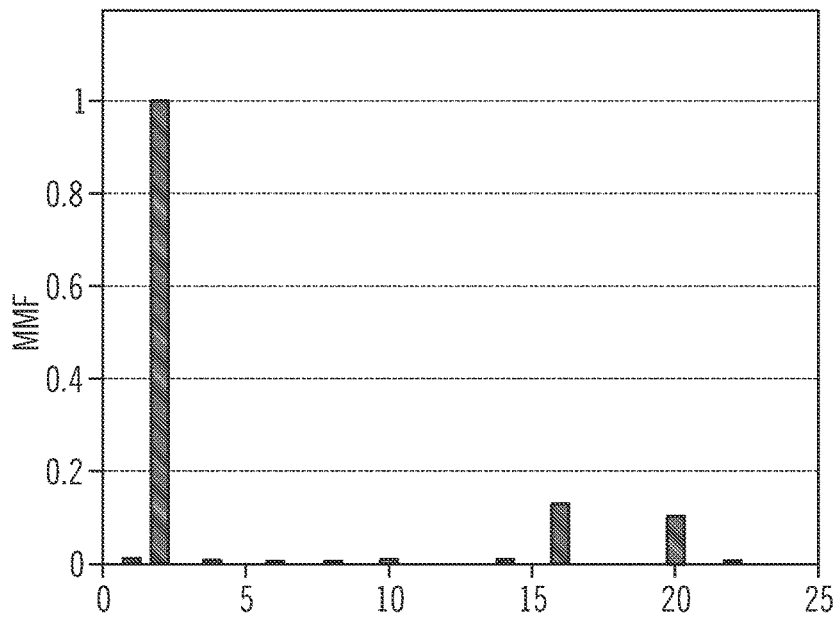

FIGS. 11 and 12 show, for the electric machine according to FIG. 9, the distribution of the magnetomotive force over a full revolution of the rotor of $2\pi$ (FIG. 11) as well as the distribution of the harmonics of the magnetomotive force from the order 0 to 25, inclusively in each case (FIG. 12).

It can be seen that virtually no sub-harmonic waves exist below the second harmonic used as the working wave. The higher harmonics are also very small in the implementation of the machine according to FIG. 9.

Figure 13:
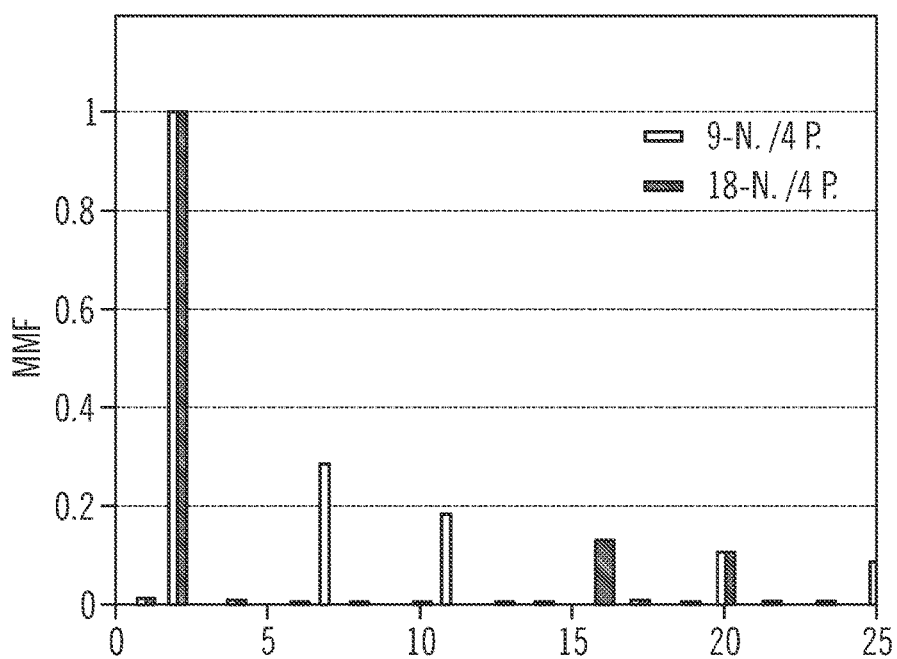

This will become particularly obvious if the properties of the machine are compared with one that does not comprise twice the number of slots and hence is realized with only four poles of the rotor and nine slots in the stator. This comparison is illustrated in FIG. 13. One can see that in particular the seventh, 11th and 25th harmonics could again be considerably reduced with the suggested principle according to FIG. 9.

The suggested principle can be applied to a great number of different machine types. This principle can be applied, for instance, with equal benefit to asynchronous machines and synchronous machines. A cage rotor, a solid rotor or a wound rotor, for instance, can be used for the asynchronous machines. In case of synchronous machines, the principle can be applied to synchronous machines with excitation by permanent magnets, to synchronous machines excited by electricity as well as to synchronous reluctance machines. In case of synchronous machines with excitation by permanent magnets, surface magnets, buried magnets such as e.g. tangentially buried magnets, radially buried magnets, V-shaped buried magnets or multilayer magnets can be used in the rotor. In the following, selected machine types are presented using examples in which the suggested principle is applied in each case.

Figure 14:
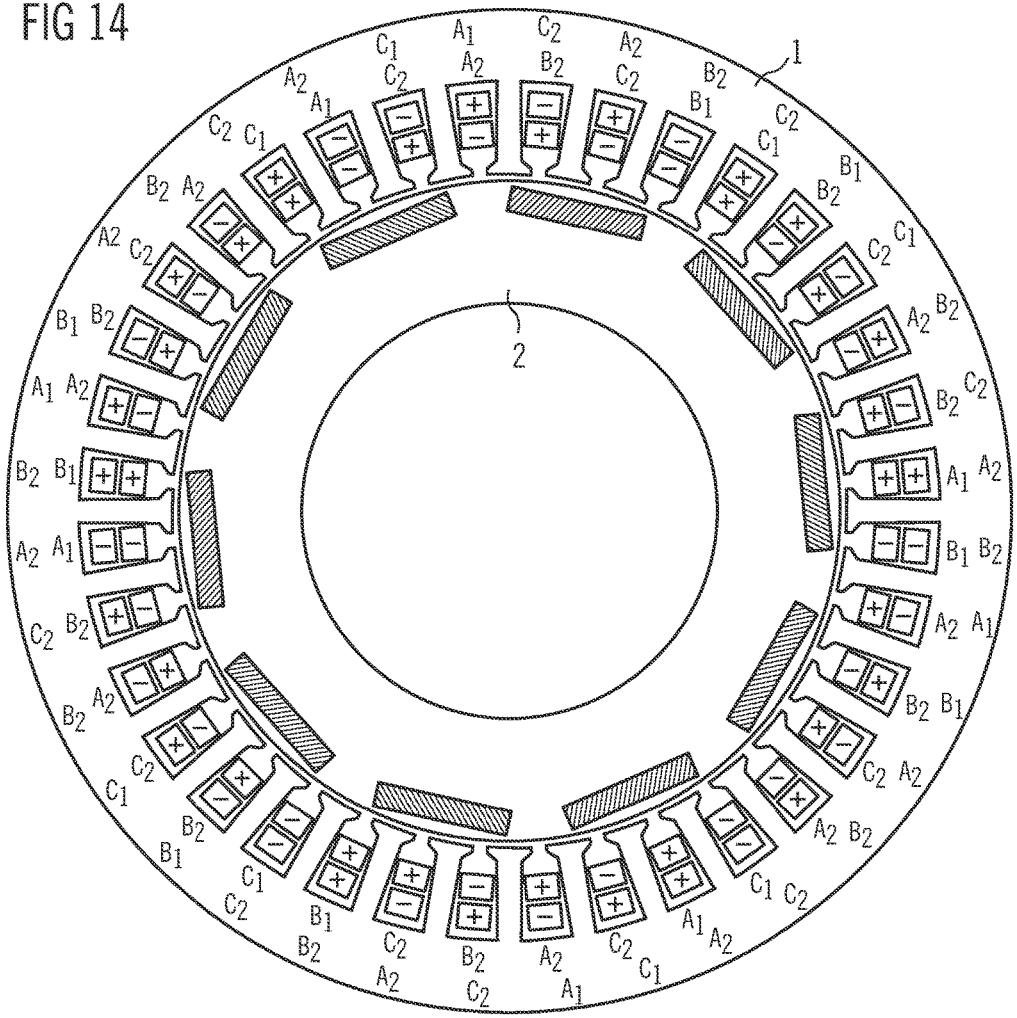

FIG. 14 shows an exemplary embodiment of the suggested principle in a machine comprising a stator 1 having 36 slots and a rotor 2 having ten permanent magnets. The implementation according to FIG. 14 corresponds to the implementation of FIG. 3. In this respect, the description will not be repeated here.

Figure 15:
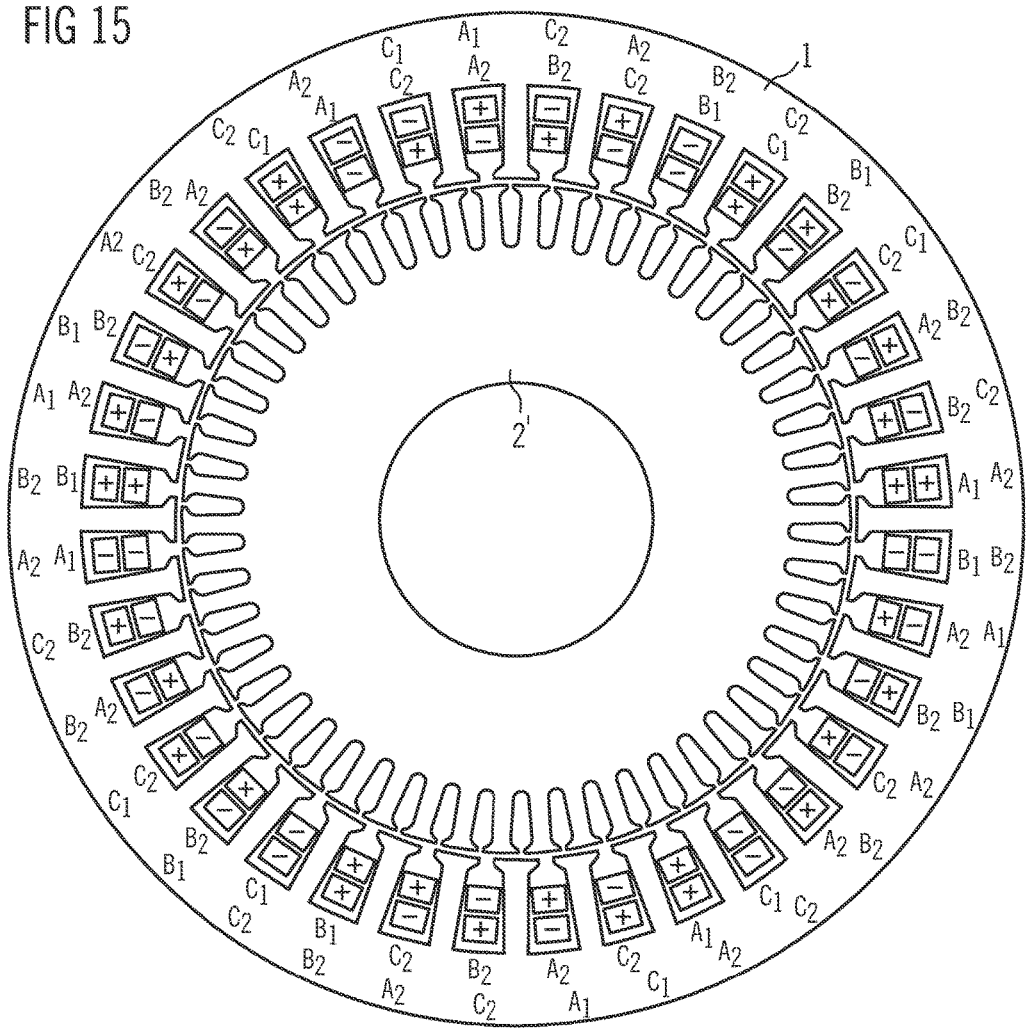

FIG. 15 shows another embodiment of the electric machine in which the same stator 1 is used as in FIG. 14. The rotor is not realized with permanent magnets, however, but as a rotor of an asynchronous machine, and it is provided with the reference symbol 21.

Figure 16:
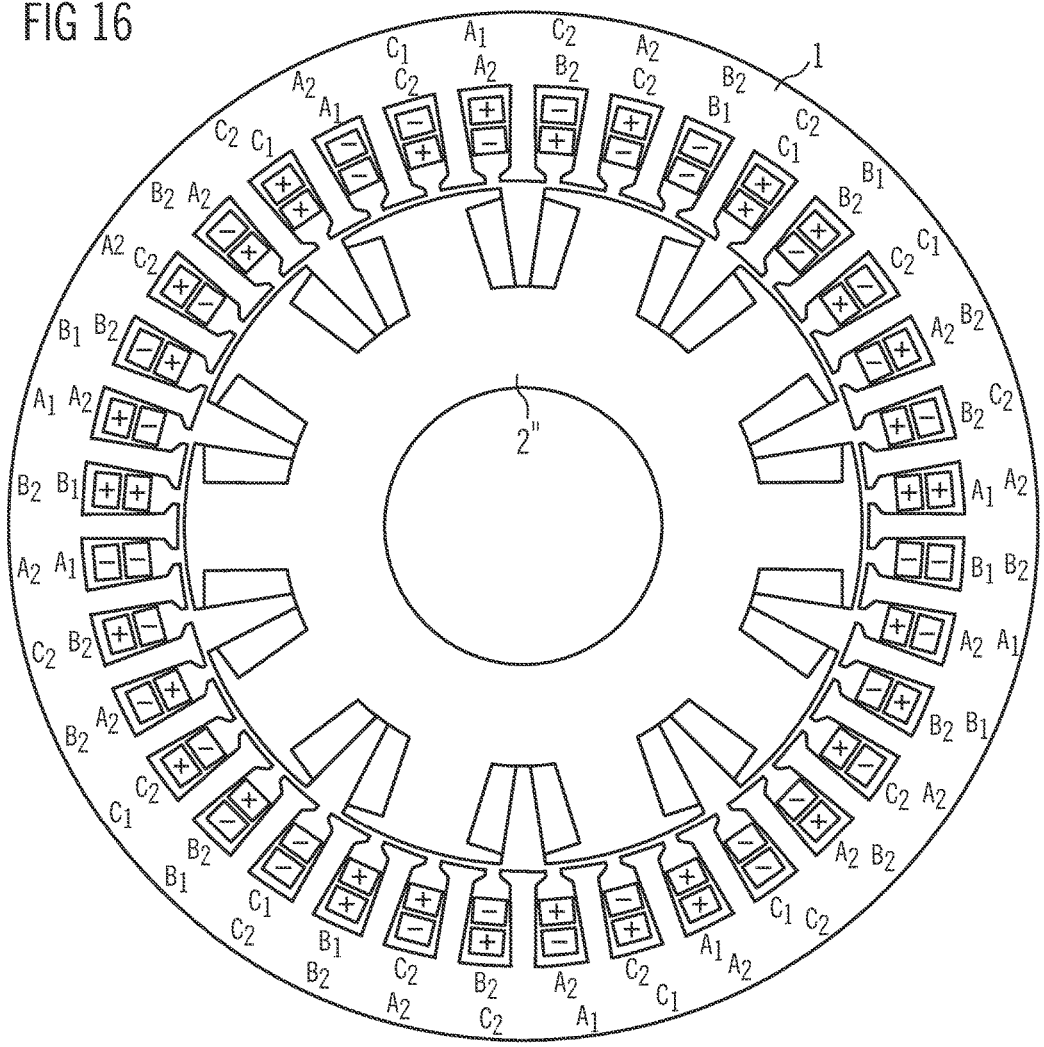

FIG. 16 shows an implementation of the suggested principle in the case of a synchronous machine comprising 36 slots, which corresponds to that of FIG. 14. However, the rotor does not have any permanent magnets, but in like manner slots and teeth. The slots are designed for receiving ten coils which serve for producing a magnetic field by means of 10 electromagnetically realized north and south poles. This rotor is designated with the reference symbol 2" and serves for forming a current-excited synchronous machine.

Figure 17:
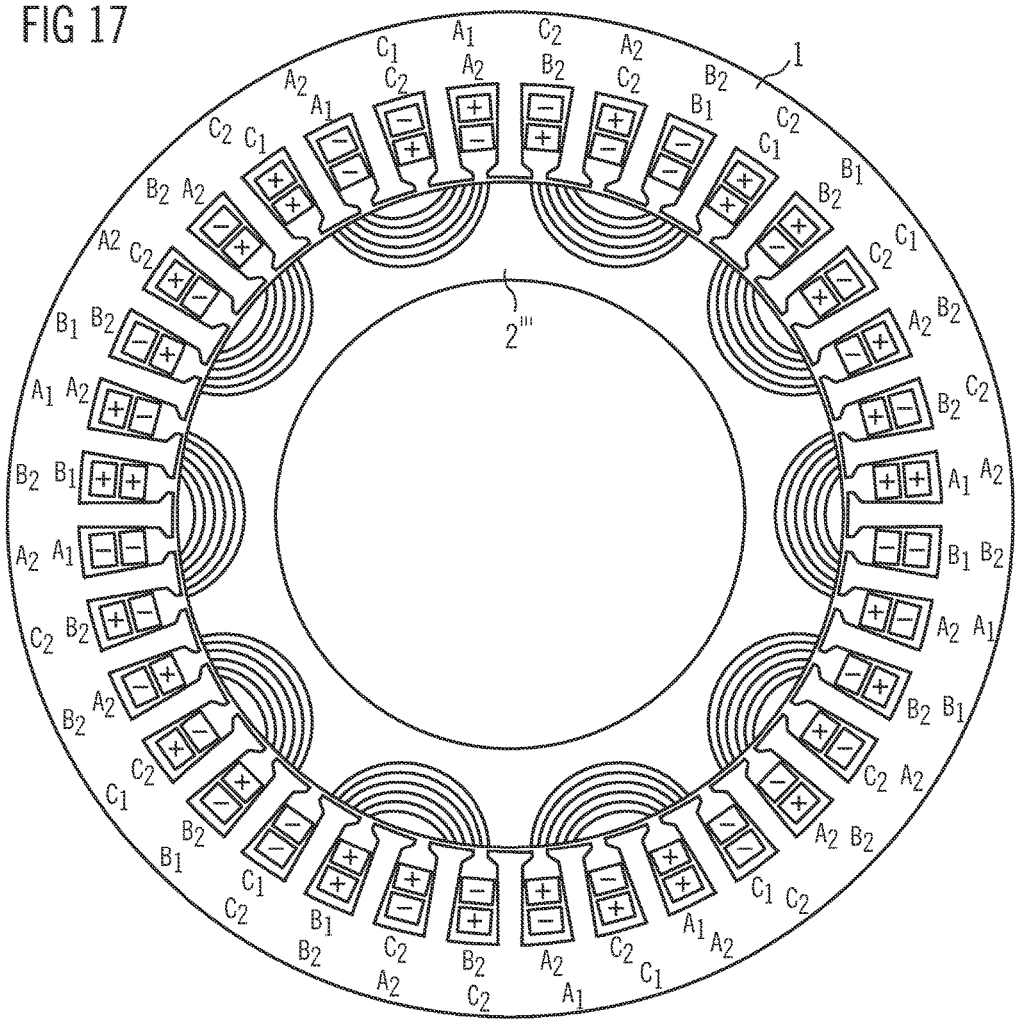

In FIG. 17, too, the stator comprising the stator winding of FIGS. 14 to 16 has been adopted unchanged. However, the rotor is realized here as a reluctance rotor 2''' in such a manner that the ten poles are constituted by a varying reluctance along the circumference of the rotor.

Figure 18:
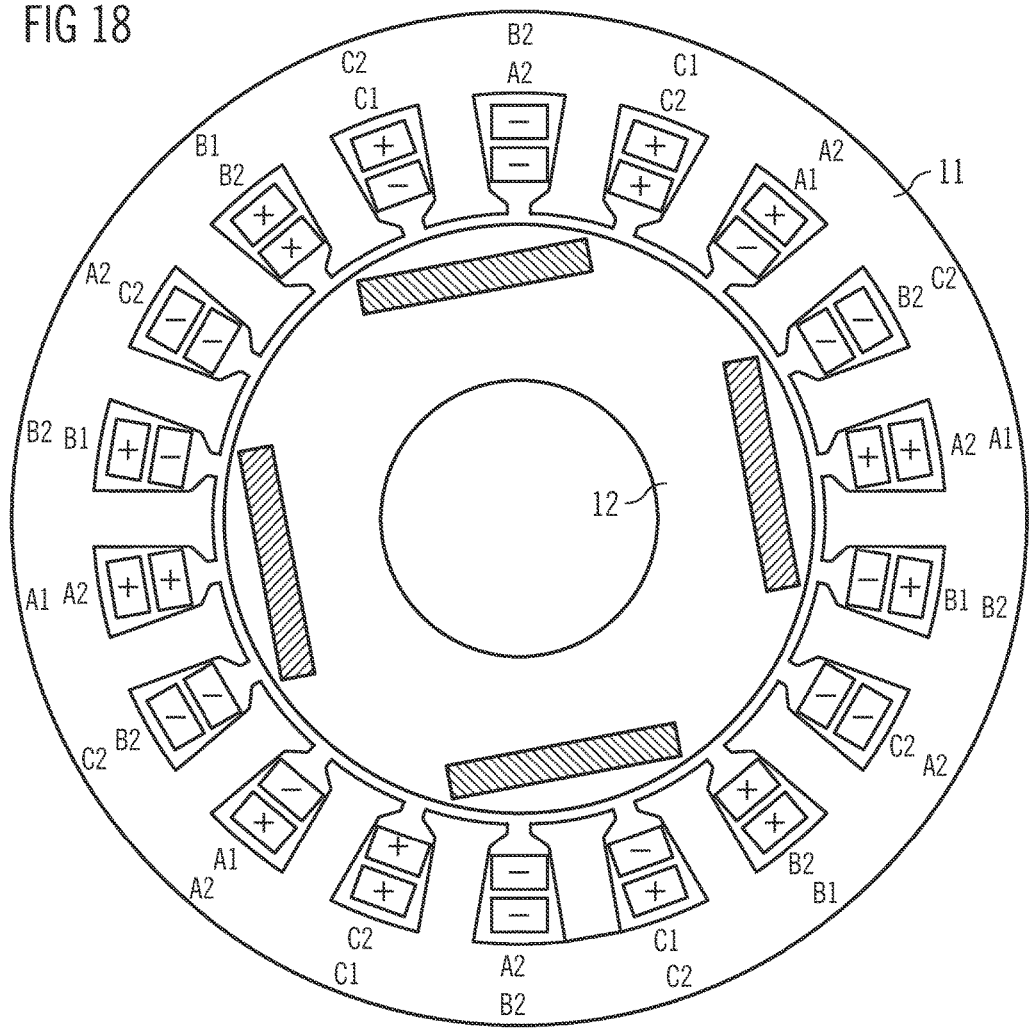

FIG. 18 shows a machine with permanent magnet type excitation and comprising 18 slots in the stator 11 and four poles in the rotor 12. In terms of construction and mode of operation, this machine corresponds to that of FIG. 9 and in this respect will not be described here once again.

Figure 19:
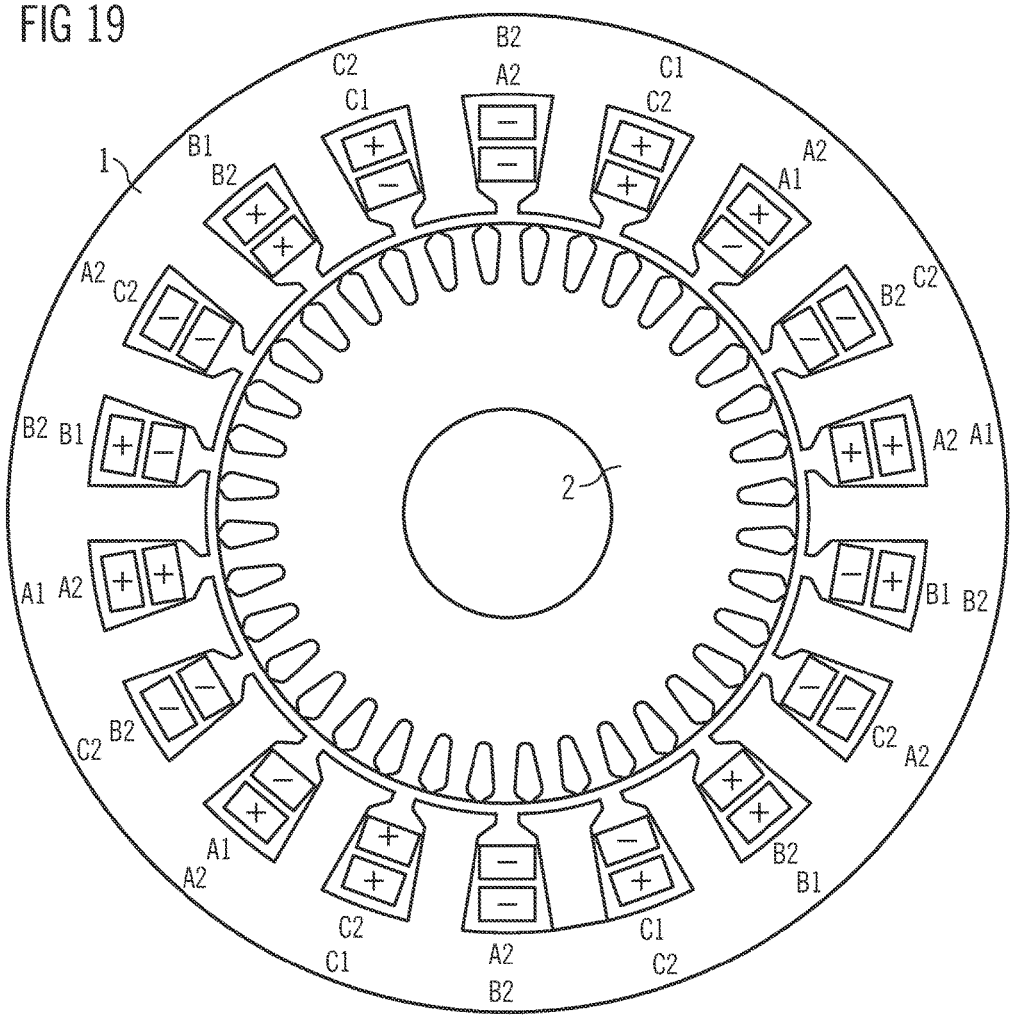

In analogy to FIG. 15, the implementation with 18 slots and four poles also allows, instead of the permanent magnets in the rotor for constituting a synchronous machine, to use it as an asynchronous machine and to this end develop a corresponding internal rotor as it is shown in FIG. 19.

Figure 20:
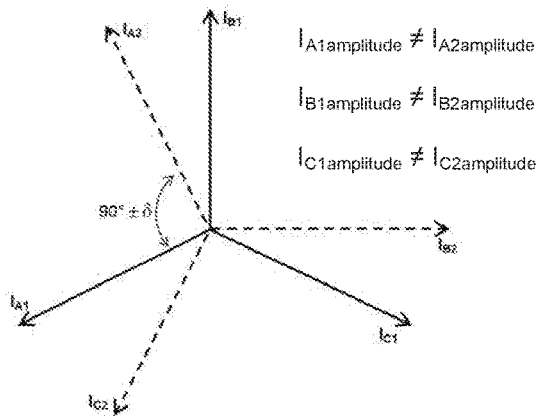
FIG. 20 shows an example of a multi-phase electricity system which is shifted in the electric phase by an angle of 90 degrees plus an angle Delta.

FIG. 20 shows an example of a multi-phase electricity system which is shifted in the electric phase by an angle of 90 degrees plus an angle Delta. For example, the winding system comprising the respectively second sub-windings may be supplied by a multi-phase electricity system which is shifted in the electric phase by an angle of 90 degrees plus an angle Delta relative to a multi-phase electricity system for supplying the winding system comprising the respectively first sub-windings.

Figure 21:
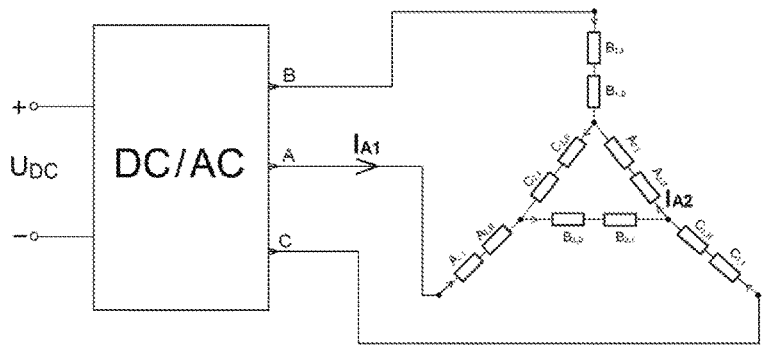
FIG. 21 shows an example of a Delta connection supplied with a common inverter.

FIG. 21 shows an example of a Delta connection supplied with a common inverter. For example, a winding system comprising the respectively first sub-windings and the winding system comprising the respectively second sub-windings may be interconnected in a star-delta connection and supplied by a common inverter, with the ratio between the winding numbers of the coils in the delta and the winding numbers of the coils in the star being in a range from including 1.3:1 to 2.5:1. In another example, a winding system comprising the respectively first sub-windings and the winding system comprising the respectively second sub-windings may be interconnected in a star-delta connection and supplied by a common inverter, with the ratio between the winding numbers of the coils in the delta and the winding numbers of the coils in the star being $\sqrt{3}:1$.

Figure 22:
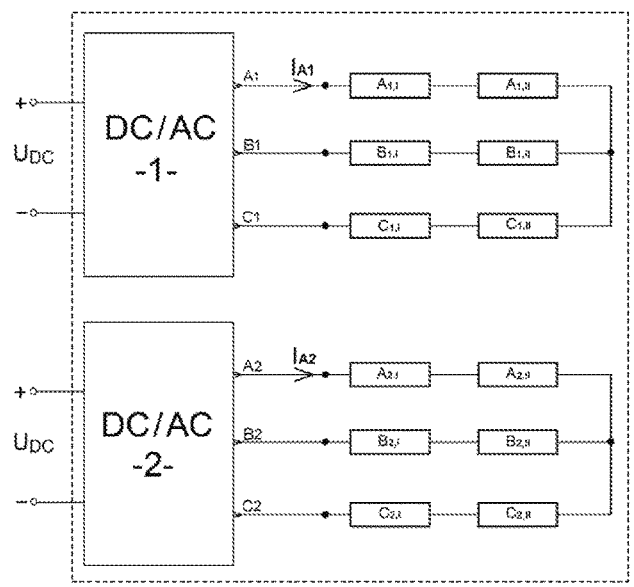
FIG. 22 shows an example of a first winding system supplied with a first inverter, and second winding system supplied with a second inverter.

FIG. 22 shows an example of a first winding system supplied with a first inverter, and second winding system supplied with a second inverter. For example, a first inverter may be provided for supplying the winding system comprising the respectively first sub-windings with a first multi-phase electricity system, and a second inverter may be provided for supplying the winding system comprising the respectively second sub-windings with a second multi-phase electricity system.

LIST OF REFERENCE NUMERALS 1 stator
2 rotor
2' rotor
2" rotor
2''' rotor
3 slot
4 tooth
11 stator
12 rotor
A electric phase
A1 first sub-winding
A2 second sub-winding
B electric phase
B1 first sub-winding
B2 second sub-winding
C electric phase
C1 first sub-winding
C2 second sub-winding I first multi-strand winding
II second multi-strand winding
N north pole
Nw1 winding number
Nw2 winding number
Nw2' winding number
Nw21 winding number
Nw22 winding number
p pole pair number
S south pole

The invention claimed is:

1. An electric machine, comprising:
a stator and a rotor which can be moved in relation to the stator and has a pole pair number p, wherein
the stator comprises a first multi-strand winding and at least one second multi-strand winding,
the first multi-strand winding comprises a first and a second sub-winding which are mechanically shifted in relation to each other, and the first and second sub-windings formed by coils,
the second multi-strand winding comprises a first and a second sub-winding which are mechanically shifted in relation to each other, and the first and second sub-windings formed by coils,
in a slot of the stator, a winding number of a coil of the first sub-winding of a multi-strand winding differs from a winding number of a coil of the second sub-winding of said multi-strand winding,
the winding layout for the first and the second sub-winding of at least one of the multi-strand windings are different in that the number of coils of the sub-windings are different in that the number of coils of the sub-windings are different, and
the stator has a number of slots that is twice the number of slots minimally required for a given pole pair number p of the rotor for one of the multi-strand windings.

2. The electric machine according to claim 1, wherein the number of the slots is doubled with respect to the number of the slots minimally required for a given pole pair number p of the rotor and further for a given number of coils of a strand on neighboring teeth and for a given number of the strands.

3. The electric machine according to claim 1, wherein the winding number of the coils of the first sub-winding and the winding number of the coils of the second sub-winding differ from each other such that in operation of the electric machine a first undesired sub-harmonic of the magnetomotive force caused by the stator is reduced.

4. The electric machine according to claim 1, wherein the winding number of the coils of the first sub-winding is in an interval between including 50% and 100% of the winding number of the coils of the second sub-winding.

5. The electric machine according to claim 1, wherein arranged in each slot of the stator are at least two coils with different winding numbers or at least two coils of different strands.

6. The electric machine according to claim 1, wherein the coils of each multi-strand winding are arranged around at least two neighboring teeth of the stator, with the teeth of the stator being formed in each case between neighboring slots of the stator.

7. The electric machine according to claim 1, wherein the first and second multi-strand winding is a three-phase winding in each case.

8. The electric machine according to claim 1, wherein the ratio of the number of the slots to the number of the poles is equal to 36/10 or 18/4 or to integral multiples of the number of the slots and the number of the poles, with the number of the poles being equal to twice the pole pair number p.

9. The electric machine according to claim 1, wherein
the first and second multi-strand windings have the same number of strands and are designed for the same number of poles,
the first and second multi-strand windings are spatially shifted with respect to each other by an electric angle,
only coils of one multi-strand winding are inserted in each slot of the stator.

10. The electric machine according to claim 1, wherein a winding system comprising the respectively second sub-windings is supplied by a multi-phase electricity system which is shifted in the electric phase by an angle of 90 degrees plus an angle Delta relative to a multi-phase electricity system for supplying a winding system comprising the respectively first sub-windings.

11. The electric machine according to claim 10, wherein the angle Delta is equal to zero.

12. The electric machine according to claim 10, wherein the angle Delta differs from zero.

13. The electric machine according to claim 1, wherein
a winding system comprising the respectively first sub-windings is supplied by means of a first multi-phase electricity system with a first current amplitude, and
a winding system comprising the respectively second sub-windings is supplied by means of a second multi-phase electricity system with a second current amplitude differing from the first current amplitude.

14. The electric machine according to claim 1, wherein
the winding number of the coils of the first sub-winding and the winding number of the coils of the second sub-winding of the first multi-strand winding differ from each other, and
the winding number of the coils of the first sub-winding and the winding number of the coils of the second sub-winding of the second multi-strand winding differ from each other.

15. The electric machine according to claim 1, wherein a first inverter is provided for supplying a winding system comprising the respectively first sub-windings with a first multi-phase electricity system and a second inverter is provided for supplying a winding system comprising the respectively second sub-windings with a second multi-phase electricity system.

16. The electric machine according to claim 1, wherein the winding system comprising the respectively first sub-windings and the winding system comprising the respectively second sub-windings are interconnected in a star-delta connection and supplied by a common inverter, with the ratio between the winding numbers of the coils in the delta and the winding numbers of the coils in the star being in a range from including 1.3:1 to 2.5:1.

17. The electric machine according to claim 1, wherein a winding system comprising the respectively first sub-windings and a winding system comprising the respectively second sub-windings are interconnected in a star-delta connection and supplied by a common inverter, with the ratio between the winding numbers of the coils in the delta and the winding numbers of the coils in the star being $\sqrt{3}:1$.

18. The electric machine according to claim 1, wherein
a coil of a sub-winding of a multi-strand winding in a first slot has a first winding number, and
the coil in a second slot has a second winding number.

19. The electric machine according to claim 18, wherein the stator comprises two opposite main faces for contacting the electric winding, a first terminal of the coil being formed on a first main face of the opposite main faces and a second terminal of the coil being formed on a second main face of the opposite main faces.

20. The electric machine according to claim 18 or 19, wherein
   in the first slot a further coil of the first winding number is provided, and
   in the second slot a further coil of a third winding number is provided, with the first winding number differing from the second winding number.

21. The electric machine according to claim 20, wherein the coils in the first slot are associated to different strands and the coils in the second slot are associated to the same strand and different sub-windings.

22. The electric machine according to claim 1, wherein the electric machine comprises one of the following types: a linear machine, axial flux machine, radial flux machine, asynchronous machine, synchronous machine.

23. The electric machine according to claim 1, which is designed as a machine with an internal rotor or as a machine with an external rotor.

24. The electric machine according to claim 1, wherein the rotor is one of the following types: a cage rotor, a multilayer rotor in case of the asynchronous machine or a permanent magnet rotor in case of the synchronous machine, a rotor with buried magnets or an electrically supplied rotor, in particular a non-salient pole rotor, a leg pole rotor, heteropolar rotor, homopolar rotor or synchronous reluctance rotor.

* * * * *

UNITED STATES PATENT AND TRADEMARK OFFICE
CERTIFICATE OF CORRECTION

PATENT NO. : 10,250,091 B2
APPLICATION NO. : 14/783837
DATED : April 2, 2019
INVENTOR(S) : Gurakuq Dajaku Page 1 of 1

It is certified that error appears in the above-identified patent and that said Letters Patent is hereby corrected as shown below:

On the Title Page

Item (56) OTHER PUBLICATIONS insert:
--HENDERSHOT JR. et al., Design of Brushless Permanent Magnet Motors, 1994, pgs 3-9 to 3-13 (Year: 1994)--

In the Claims

Column 9, Line 30-33 Claim 1:
Replace "multi-strand windings are different in that the number of coils of the sub-windings are different in that the number of coils of the sub-windings are different, and" with --multi-strand windings are different in that the number of coils of the sub-windings are different, and--

Signed and Sealed this
Sixteenth Day of July, 2019

Andrei Iancu
*Director of the United States Patent and Trademark Office*